United States Patent [19]
Ramesh et al.

[11] Patent Number: 5,635,112
[45] Date of Patent: *Jun. 3, 1997

[54] HYDROPHOBICALLY-MODIFIED DEMULSIFIERS FOR OIL-IN-WATER SYSTEMS

[75] Inventors: Manian Ramesh, Lisle; Ananthasubramanian Sivakumar, Naperville, both of Ill.

[73] Assignee: Nalco Chemical Company, Naperville, Ill.

[ * ] Notice: The term of this patent shall not extend beyond the expiration date of Pat. No. 5,,429,749.

[21] Appl. No.: 507,104

[22] Filed: Jul. 26, 1995

Related U.S. Application Data

[63] Continuation-in-part of Ser. No. 73,884, Jun. 9, 1993, abandoned.

[51] Int. Cl.$^6$ .................... B01D 17/05; C02F 1/56
[52] U.S. Cl. ............... 252/341; 252/331; 252/344; 252/3; 252/58; 210/708; 524/922
[58] Field of Search .................. 252/358, 331, 252/344, 341; 210/708, 734, 928; 524/922

[56] References Cited

U.S. PATENT DOCUMENTS

| | | | |
|---|---|---|---|
| 3,316,181 | 4/1967 | Sackis | 252/344 |
| 3,585,148 | 6/1971 | Sackis | 252/341 |
| 3,782,546 | 1/1974 | Kirwin et al. | 209/166 |
| 4,151,202 | 4/1979 | Hunter et al. | 524/351 |
| 4,555,329 | 11/1985 | Sykes et al. | 209/5 |
| 4,617,362 | 10/1986 | Becker et al. | 526/209 |
| 4,715,962 | 12/1987 | Bhattacharyya et al. | 210/708 |
| 4,734,473 | 3/1988 | Fong et al. | 526/263 |
| 4,769,432 | 9/1988 | Fong | 526/291 |
| 4,802,992 | 2/1989 | Fong et al. | 210/709 |
| 4,835,234 | 5/1989 | Valint | 210/708 |
| 4,968,435 | 11/1990 | Neff et al. | 210/734 |
| 5,006,596 | 4/1991 | Chen et al. | 524/555 |
| 5,013,452 | 5/1991 | Bellos et al. | 210/708 |
| 5,128,046 | 7/1992 | Marble et al. | 210/708 |
| 5,152,903 | 10/1992 | Neff et al. | 210/734 |
| 5,211,854 | 5/1993 | Liao et al. | 210/734 |
| 5,246,547 | 9/1993 | Finck et al. | 162/164.6 |
| 5,283,306 | 2/1994 | Ramesh et al. | 526/312 |
| 5,292,793 | 3/1994 | Ramesh et al. | 524/555 |
| 5,330,546 | 7/1994 | Ramesh et al. | 210/734 |
| 5,338,816 | 8/1994 | Ramesh et al. | 526/312 |
| 5,429,749 | 7/1995 | Chung et al. | 210/734 |

Primary Examiner—Richard D. Lovering
Assistant Examiner—Daniel S. Metzmaier
Attorney, Agent, or Firm—Robert A. Miller; James J. Drake

[57] ABSTRACT

A method for breaking an oil-in-water emulsion which comprises the addition of a hydrophobically-modified polyelectrolyte copolymer comprising a diallyldimethylammonium chloride and a hydrophobically-associating monomer selected from the group consisting of quaternized dialkylaminoalkylacrylates, quaternized dialkylaminoalkylmethacrylates, and alkyl esters of (meth) acrylic acids, preferably ethylhexylacrylate, to the emulsion.

3 Claims, 1 Drawing Sheet

HYDROPHOBICALLY-MODIFIED DEMULSIFIERS FOR OIL-IN-WATER SYSTEMS

The present application is a continuation-in-part of Ser. No. 08/073,884 filed Jun. 9, 1993, now abandoned, entitled "Hydrophobic Demulsifiers for Oil-in-Water Systems", the disclosure of which is incorporated herein by reference.

The present invention relates generally to the use of hydrophobically modified diallyldimethylammonium chloride demulsifiers to break oil-in-water emulsions.

BACKGROUND OF THE INVENTION

An emulsion is an intimate mixture of two liquid phases, such as oil and water, in which the liquids are mutually insoluble and where either phase may be dispersed in the other. An oily waste emulsion, in which oil is dispersed in the water phase, may contain any of various types of oil in a wide range of concentrations. These oils are defined as substances that can be extracted from water by hexane, carbon tetrachloride, chloralform, or fluorocarbons. In addition to oils, typical contaminants of these emulsions may be solids, silt, metal particles, emulsifiers, cleaners, soaps, solvents, and other residues. The types of oils found in these emulsions will depend on the industry. They may be fats, lubricants, cutting fluids, heavy hydrocarbons such as tars, grease, crude oils, and diesel oils, and also light hydrocarbons including gasoline, kerosene, and jet fuel. Their concentration in the wastewater may vary from only a few parts per million to as much as 5 to 10%, by volume.

A stable oil-in-water emulsion is a colloidal system of electrically charged oil droplets surrounded by an ionic environment. Emulsion stability is maintained by a combination of physical and chemical mechanisms.

Emulsions may be broken by chemical, electrolytic, or physical methods. The breaking of an emulsion is also called resolution, since the aim is to separate the original mixture into its parts. Chemicals are commonly used for the treatment of oily wastewaters, and are also used to enhance mechanical treatment. In breaking emulsions, the stabilizing factors must be neutralized to allow the emulsified droplets to coalesce. The accumulated electric charges on the emulsified droplet are neutralized by introducing a charge opposite to that of the droplet. Chemical emulsion breakers provide this opposite charge.

The treatment of oily wastewater is normally divided into two steps, i.e., coagulation which is the destruction of the emulsifying properties of the surface active agent or neutralization of the charged oil droplet, and flocculation which is the agglomeration of the neutralized droplets into large, separable globules.

Traditionally, sulfuric acid has been used in oily waste treatment plants as the first step in emulsion breaking. Acid converts the carboxyl ion in surfactants to carboxylic acid, allowing the oil droplets to agglomerate. Chemical coagulating agents, such as salts of iron or aluminum, can be used in place of acid, with the additional benefit that these aid in agglomeration of the oil droplets. However, the aluminum or iron forms hydroxide sludges that are difficult to dewater. Acids generally break emulsions more effectively than coagulant salts, but the resultant acidic wastewater must be neutralized after oil/water separation.

Some examples of inorganic emulsion breakers useful in oil-in-water emulsions are: polyvalent metal salts such as alum, $AlCl_3$, $FeCl_3$, and $Fe_2(SO_4)_3$, mineral acids such as $H_2SO_4$, HCl, and $HNO_3$, and adsorbents such as pulverized clay and lime.

Organic demulsifiers are extremely effective emulsion breaking agents, giving more consistent results and producing better effluent quality than an inorganic program. In many treatment plants, organic emulsion breakers have replaced traditional alum treatment for exactly those reasons. In addition to yielding a better quality effluent, organic emulsion breakers often require lower dosages than a corresponding inorganic treatment. Organic emulsion breakers reduce the amount of sludge generated in a treatment program by as much as 50 to 75%.

Some examples of organic emulsion breakers useful in oil-in-water systems are polyamines, polyacrylates and their substituted copolymers.

The present inventors have discovered through extensive experimentation that hydrophobically modified diallyldimethylammonium chloride (DADMAC) polymers assist in removing oil from various wastewater effluents contaminated with up to 5% oil. The clarity of the treated effluents was excellent, e.g., the untreated water had a turbidity of >2,000 NTU and the water treated with the demulsifier according to the present invention had a turbidity of approximately 20 NTU. Moreover, poly(DADMAC) alone demonstrated no significant demulsification activity; whereas hydrophobically modified DADMAC polymers exhibited substantial demulsification activity.

Furthermore, the hydrophobically modified DADMAC demulsifier of the present invention is an all organic treatment which is an attractive alternative when it is undesirable to use an inorganic treatment.

The present invention also provides many additional advantages which shall become apparent as described below.

SUMMARY OF THE INVENTION

A method for breaking an oil-in-water emulsion which comprises the addition of a hydrophobically-modified polyelectrolyte copolymer demulsifier comprising a diallyldimethylammonium chloride and a hydrophobically-associating monomer selected from the group consisting of quaternized dialkylaminoalkylacrylates, quaternized dialkylaminoalkylmethacrylates, and esters of (meth)acrylic acids, preferably ethylhexylacrylate.

The demulsifier is preferably formed by a semi-batch process which comprises the steps of: adding diallyldimethylammonium chloride to a polymerization reactor vessel in an amount between about 1 to about 19 weight percent; heating the diallyldimethylammonium chloride to a temperature in the range between about 47° C. to about 57° C.; adding a polymer initiator dropwise to the diallyldimethylammonium chloride in an amount between about 0.05 to about 0.4 weight percent; adding a hydrophobically-associating monomer dropwise to the diallyldimethylammonium chloride in an amount between about 3 to about 19 weight percent; and heating the mixture of diallyldimethylammonium chloride, polymer initiator and hydrophobically-associating monomer to a temperature in the range between about 47° C. to about 82° C.

Other and further objects, advantages and features of the present invention will be understood by reference to the following specification in conjunction with the annexed drawings.

DESCRIPTION OF THE PREFERRED EMBODIMENTS

Figure 1:
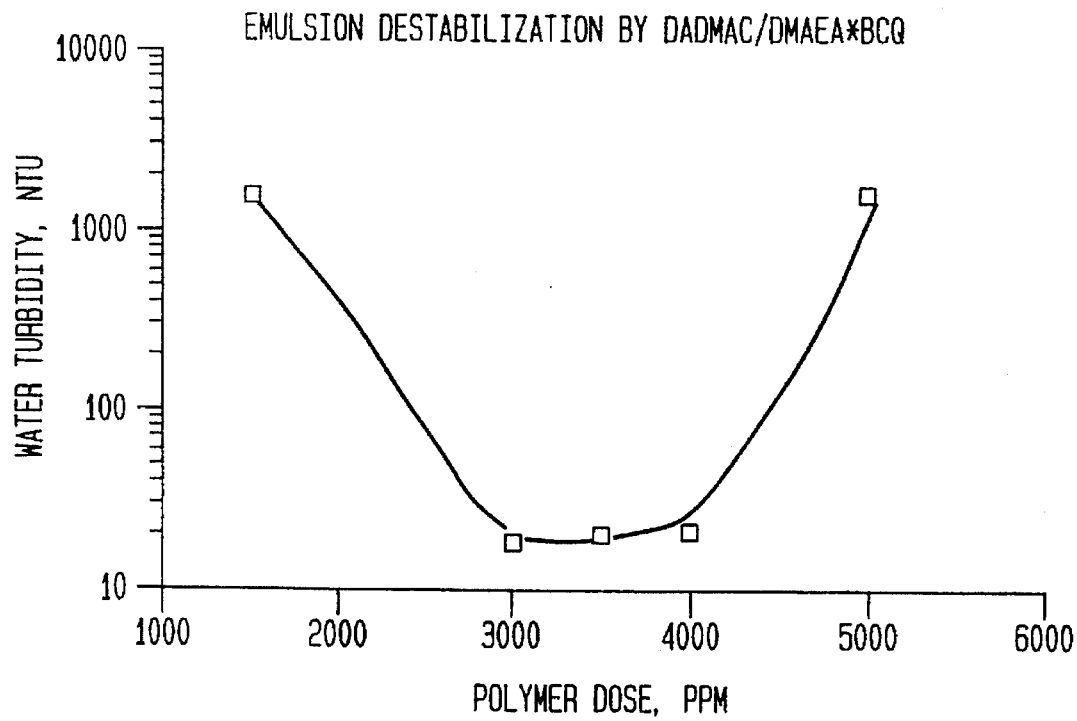
FIG. 1 is a graph plotting water turbidity versus DADMAC/DMAEA.BCQ dosage.

The hydrophobically-modified demulsifier according to the present invention is preferably used to form polymer dispersions. The oil-in-water emulsion breaking processes uses copolymers of diallyldimethylammonium chloride (DADMAC) and a hydrophobically-associating monomer selected from the group consisting of: quaternized dimethylaminoethylacrylates (DMAEA), quaternized dimethylaminoethylmethacrylates (DMAEM) and alkyl ($C_6$–$C_{20}$) esters of (meth)acrylic acids, preferably ethylhexylacrylate.

The DADMAC can be prepared in accordance with any conventional manner such as the technique described in Hunter et al. U.S. Pat. No. 4,151,202, which issued on Apr. 24, 1979, and which is incorporated herein by reference.

The invention is a method for breaking an oil-in-water emulsion which comprises:

A. adding an effective emulsion-breaking amount of a hydrophobically-modified polyelectrolyte copolymer selected from the group consisting of poly(diallyldimethylammonium chloride/dimethylaminoethylacrylate benzyl chloride quaternary), poly(diallyldimethylammonium chloride/dimethylaminoethylacrylate cetyl chloride quaternary), poly(diallyldimethylammonium chloride/dimethylaminoethylmethacrylate benzyl chloride quaternary), poly(diallyldimethylammonium chloride/dimethylaminoethylmethacrylate cetyl chloride quaternary and poly(diallyldimethylammonium chloride/ethyl hexyl acrylate);

B. allowing said emulsion to separate into an oil phase and a water phase; and,

C. recovering said separated phases.

The hydrophobically-modified polyelectrolyte copolymer consists of diallyldimethylammonium chloride and the hydrophobically-associating monomer which are present in a molar ratio in the range from 99:1 to 20:80. The hydrophobically-associating monomers are ethyl hexyl acrylate, dimethylaminoethylmethacrylate cetyl chloride quaternary, dimethylaminoethylmethacrylate benzyl chloride quaternary, dimethylaminoethylacrylate cetyl chloride quaternary, and dimethylaminoethylacrylate benzyl chloride quaternary.

The quaternized dimethylaminoethylacrylate is preferably selected from the group consisting of: dimethylaminoethylacrylates having $C_6$ to $C_{20}$ chloride quaternary, e.g., dimethylaminoethylacrylate benzyl chloride quaternary (DMAEA.BCQ) or dimethylaminoethylacrylate cetyl chloride quaternary (DMAEA.CCQ).

The quaternized dimethylaminoethylmethacrylate is preferably selected from the group consisting of: dimethylaminoethylmethacrylates having $C_6$ to $C_{20}$ chloride quaternary, e.g., dimethylaminoethylmethacrylate benzyl chloride quaternary (DMAEA.BCQ) or dimethylaminoethylmethacrylate cetyl chloride quaternary (DMAEA.CCQ)

The hydrophobically-modified demulsifier according to the present invention preferably has a molar ratio of diallyldimethylammonium chloride to hydrophobically-associating monomer in the range between about 99:1 to about 20:80.

The hydrophobically-modified polyelectrolyte copolymer is added to the oil-in-water emulsion in an amount of between about 0.03 to about 1.0% by weight of the emulsion.

A semi-batch process is preferably used to make the hydrophobically-modified dispersants and comprises the following steps:

a. adding diallyldimethylammonium chloride to a polymerization reaction vessel in an amount between about 1 to about 19 weight percent;

b. heating the diallyldimethylammonium chloride to a temperature in the range between about 47° C. to about 57° C.;

c. adding a polymer initiator dropwise to the diallyldimethylammonium chloride in an amount between about 0.05 to about 0.40 weight percent;

d. adding a hydrophobically-associating monomer dropwise to the diallyldimethylammonium chloride in an amount between about 3 to about 19 weight percent; and e. heating the mixture of diallyldimethylammonium chloride, polymer initiator and hydrophobically-associating monomer to a temperature in the range between about 47° C. to about 82° C.

Typically, deionized water is added periodically as needed during the polymerization process in a total amount between about 63 to about 88 weight percent. In some instances, it is preferable to mix diallyldimethylammonium chloride with NaCl and deionized water prior to addition to the reaction vessel. The NaCl is added in an amount between about 2 to about 3.5 weight percent and the deionized water is added in an amount between about 1 to about 2.5 weight percent. This diallyldimethylammonium chloride solution has a concentration of diallyldimethylammonium chloride in the range between about 54 to about 59 weight percent.

The diallyldimethylammonium chloride, polymer initiator and hydrophobic monomer are heated at a temperature in the range between about 47° C. to about 57° C. for a period of between about 6 to 8 hours. Thereafter, the temperature of the reaction vessel is increased to about 72° C. to about 82° C. for a period of between about 5 to about 7 hours. After polymerization has been completed, the copolymer product is typically diluted with deionized water, cooled and stored.

The polymerization initiator is selected from the group consisting of 2,2'-azobis(2-amidinopropane) hydrochloride (V50), ammonium persulfate, 2,2'-azobis (N,N'-dimethylene isobutylamide) dihydrochloride, and ammonium persulfate/sodium meta bisulfite.

The present invention can best be understood by reference to the following working and comparative examples.

EXAMPLE 1

A hydrophobically-modified demulsifier was formed from diallyldimethyl-ammonium chloride (DADMAC) and dimethylaminoethylmethacrylate cetyl chloride quaternary (DMAEM.CCQ) monomers using a batch process. The following reagents were used:

| | |
|---|---|
| 251.30 grams | 62% Solution of DADMAC |
| 150.00 grams | 20% Solution of DMAEM.CCQ |
| 0.30 grams | Versene |
| 10.00 grams | Adipic Acid |
| 15.00 grams | 25% Solution of Ammonium Persulfate |
| 75.00 grams | Deionized Water |

DADMAC was added to a mixture of DMAEM.CCQ, adidpic acid, versene, and deionized water. This reaction mixture was then heated to about 50° C. and thereafter the ammonium persulfate was added. The reaction vessel was purged with nitrogen at 10 psig and stirred at about 250 rpm.

After 30 minutes, a precipitate began to form so an additional 154.76 grams of a 62% solution of DADMAC, 10 grams of a 25% solution of ammonium persulfate and 0.10 grams of versene were added to the reaction vessel. Thereafter, the temperature of mixture was increased to 65° C. for 6 hours and then cooled to ambient temperature. The final molar ratio of DADMAC to DMAEM.CCQ was 96.68% to 3.32%.

The preparation of dimethylaminoethylmethacrylate cetyl bromide quaternary (DMAEM.CBQ) was effected as follows:

| 80.00 grams | 97% Cetyl Bromide |
| 40.00 grams | 99% DMAEM |
| 0.08 grams | Hydroquinone |
| 500.00 grams | Ethanol |

The above reactants were combined and heated at reflux for 4 hours. The solvent (i.e., ethanol) was removed under reduced pressure. A gummy liquid upon cooling afforded pale pink colored solid DMAEM.CBQ monomer in 96% yield. This monomer was then dissolved in deionized water to a desired dilution.

The preparation of DMAEM.CCQ was effected by stirring an aqueous solution (25% actives) of DMAEM.CBQ (1,000 grams), prepared as above, with Amberlite IRA-400 (Cl$^-$) ion exchange resin for 30 minutes. The resin was filtered and the monomer used in subsequent polymerizations.

EXAMPLE 2

A hydrophobically-modified demulsifier was formed from 70% DADMAC and 30% dimethylaminoethylacrylate benzyl chloride quaternary (DMAEA.BCQ) monomers. The following reagents were used:

| 188.03 grams | 62% Solution of DADMAC |
| 104.28 grams | 80% Solution of DMAEA.BCQ |
| 0.20 grams | Versene |
| 15.00 grams | 25% Solution of Ammonium Persulfate |
| 692.49 grams | Deionized Water |

DADMAC and 100 grams of deionized water were placed within a polymerization reaction vessel which was purged with nitrogen at 10 psig. The reactor was heated to 50° C. and the contents kept well stirred. Thereafter, the ammonium persulfate was added dropwise to the reaction vessel via a syringe pump for 2 hours. Simultaneously, DMAEA.BCQ was added dropwise to the reaction vessel via a syringe pump for 2 hours. The DMAEA.BCQ was diluted with 100 grams of deionized water prior to being loaded into the syringe pump. Thereafter, the remaining deionized water and versene were added to the reaction vessel which was then heated at 65° C. for 6 hours.

EXAMPLE 3

A hydrophobically-modified demulsifer was formed from 70% DADMAC and 30% dimethylaminoethylacrylate benzyl chloride quaternary (DMAEA.BCQ) monomers. The following reagents were used:

| 188.03 grams | 62% Solution of DADMAC |
| 104.28 grams | 80% Solution of DMAEA.BCQ |
| 0.20 grams | Versene |
| 1.17 grams | V50 |
| 706.00 grams | Deionized Water |
| 0.32 grams | H$_2$SO$_4$ |

DADMAC was placed within a polymerization reaction vessel which was purged with nitrogen at 10 psig, stirred at 300 rpm and a torque of 350 dynes-cm. The pH was adjusted to 3.5 by addition of H$_2$SO$_4$. The reactor was heated to 52° C. and the contents of the reactor were kept well stirred. This was followed by the dropwise addition of V50 and DMAEA.BCQ via separate syringe pumps, set to complete the addition over a period of 2 hours. The DMAEA.BCQ was diluted with 100 grams of deionized water prior to being loaded into the syringe pump. After 40 minutes, the torque gradually increased to 2240 dynes-cm. Thereafter, 100 grams of deionized water was added to the DADMAC which reduced the torque to 850 dynes-cm. The reaction vessel was then heated at 65° C. for 5 hours. After 2 hours and 20 minutes, the torque reached 2920 dynes-cm. 100 grams of deionized water was again added which reduced the torque to 1180 dynes-cm. After 3 hours and 15 minutes, another 100 grams of deionized water was added to the polymerizing product. After 5 hours, another 100 grams of deionized water was added to the reaction vessel and the temperature was raised to 80° C. for 1 hour. Thereafter, the resulting polymer was diluted with the remaining deionzied water, cooled and stored.

EXAMPLE 4

A hydrophobically-modified demulsifier was formed from 80% DADMAC and 20% dimethylaminoethylmethacrylate cetyl chloride quaternary (DMAEA.CCQ) monomers. The following reagents were used:

| 188.02 grams | 62% Solution of DADMAC |
| 83.43 grams | DMAEM.CCQ |
| 0.20 grams | Versene |
| 1.17 grams | V50 |
| 727.03 grams | Deionized Water |
| 0.15 grams | H$_2$SO$_4$ |

DADMAC was placed within a polymerization reaction vessel which was purged with nitrogen at 10 psig and stirred at 300 rpm. The pH was adjusted to 3.5 by addition of H$_2$SO$_4$. 150 ml of deionized water was added to the DADMAC. The reactor was heated to 52° C. This was followed by the dropwise addition of V50 and DMAEA.CCQ via separate syringe pumps for 2 hours. The DMAEA.CCQ was diluted with 100 grams of deionized water, prior to loading into the syringe pump. The reaction vessel was then heated at 65° C. for 4.5 hours after addition the DMAEA.CCQ. Between 1.5 to 2 hours 180 ml of deionized water was again added. After 4.5 hours, the temperature was raised to 70° C. for 0.5 hours. Thereafter, the resulting polymer was diluted with the remaining deionized water, cooled and stored.

EXAMPLE 5

A hydrophobically-modified demulsifier was formed using the same technique described in Example 4 above from 80% DADMAC and 20% dimethylaminoethylacrylate benzyl chloride quaternary (DMAEA.BCQ) monomers. The following reagents were used:

| | |
|---|---|
| 227.52 grams | 62% Solution of DADMAC |
| 73.68 grams | 80% Solution of DMAEA.BCQ |
| 0.40 grams | Versene |
| 1.42 grams | V50 |
| 696.63 grams | Deionized Water |
| 0.35 grams | $H_2SO_4$ |

However, the water was added as needed. Table 1 below sets forth the time of deionized water addition during the semi-batch polymerization process.

TABLE 1

| Speed of Rotation (rpm) | Torque (Dynes-cm) | Time | $H_2O$ Addition |
|---|---|---|---|
| 200 | 400 | 0 | 0 |
| 200 | 850 | 30 min. | 0 |
| 200 | 1200 | 45 min. | 50 grams |
| 200 | 700 | 45.1 min | — |
| 200 | 1600 | 1 hr. 10 min. | 50 grams |
| 200 | 1000 | 1 hr. 1 min. | — |
| 200 | 1510 | 1 hr. 35 min. | 50 grams |
| 200 | 1200 | 1 hr. 35 min. | 50 grams |
| 200 | 650 | 1 hr. 36 min. | — |
| 200 | 1500 | 1 hr. 55 in. | — |
| 200 | 1610 | 2 hr. 12 min. | 50 grams |
| 200 | 558 | 2 hr. 13 min. | — |

EXAMPLE 6

A hydrophobically-modified demulsifier was formed from 90% DADMAC and 10% dimethylaminoethylacrylate benzyl chloride quaternary (DMAEA.BCQ) monomers. The following reagents were used:

| | |
|---|---|
| 251.79 grams | 67% Solution of DADMAC |
| 39.13 grams | 80% Solution of DMAEA.BCQ |
| 0.20 grams | Versene |
| 3.36 grams | V50 |
| 678.00 grams | Deionized Water |
| 27.52 | NaCl |

The semi-batch procedure was as follows:

(1) a solution comprising 251.79 grams of a 67% solution of DADMAC, 27.52 grams of NaCl and 16.6 grams of deionized water was placed in a reactor;

(2) the polymerization reaction vessel was then purged with nitrogen, stirred at 200 rpm and heated to 57° C.;

(3) then 40 mg of versene were added to the reaction vessel;

(4) 39.13 grams of DMAEA.BCQ were diluted with 15.87 grams of deionized water, then 160 mg of versene were added, stirred and loaded into a syringe pump;

(5) 500 grams of water were disposed in a funnel adjacent to the reaction vessel and nitrogen sparged continuously;

(6) 1.68 grams of V50 were dissolved in 45.16 grams of deionized water and loaded into another syringe pump;

(7) at 57° C., 11.7 grams of the V50 solution were added to the reaction vessel, together with the dropwise addition of the DMAEA.BCQ;

(8) additional deionized water was added from time to time as required;

(9) after 5 hours the temperature was raised to 82° C. for 1 hour; and

(10) thereafter, the resulting polymer was diluted with the remaining deionized water, cooled and stored.

EXAMPLE 7

A hydrophobically-modified demulsifier was prepared from 90% DADMAC and 10% ethylhexylacrylate (EHA) in a one liter reactor flask. The DADMAC was a 67% solution prepared by evaporating 41.1 grams of water off of 305.9 grams of 58% DADMAC, leaving 284.8 grams of DADMAC.

264.8 grams of DADMAC, 28.97 grams of NaCl, 16.6 grams of deionized water, and 0.4 grams of versene added to a reactor flask, mixed at 300 rpm and heated to a temperature of 50° C. The flask was sparged with nitrogen at 8 psig. 500 grams of deionized water was placed into an addition funnel with a continuous nitrogen sparge. 22.6 grams of ethylhexylacrylate (EHA) was taken into a first glass syringe and 1.68 grams of VA-044 dissolved in 45.16 grams of water was taken into a second glass syringe, wherein the syringe pumps are set so that they will finish together. At 50° C., 20% of the VA-044 solution was pumped directly into the reactor flask, then both syringe pumps were started. Water from the addition funnel was added as needed to control the viscosity of material in the flask. Once the addition of the EHA and VA-044 was complete, the reaction mixture in the flask was stirred for about 0.5 hours. Thereafter, the reaction mixture was heated to 72° C. When the reaction mixture reached 72° C., 1.68 grams of VA-044 dissolved in 10.84 grams of water were added as a post-treatment and then the reaction mixture was stirred for two hours. Then water was added to bring the reaction mixture up to 1,000 grams.

EXAMPLE 8

A bottle test was used to evaluate the hydrophobically-modified polymer of diallyldimethylammonium chloride (DADMAC) and dimethylaminoethylacrylate benzyl chloride quaternary (DMAEA.BCQ) as a demulsifier (i.e., emulsion breaker). The demulsifier was added to 100 ml of the emulsion in a bottle, thoroughly shaken and heated at 160° F. for 45 minutes in a water bath. Then an anionic flocculant was added to flocculate the precipitated oil and the emulsion was further heated for 30 minutes. Then the water and oil were separated and the turbidity of the water was measured using a Hach turbidimeter. The results of the bottle test are set forth below in Table 2 and FIG. 1 (attached hereto).

TABLE 2

| (DADMAC/DMAEA.BCQ) | |
|---|---|
| Polymer Dosage (ppm) | Water Turbidity (NTU) |
| 0 | >2000 |
| 1500 | 1500 |
| 3000 | 17.6 |
| 3500 | 20.1 |
| 4000 | 20.5 |
| 5000 | 1568 |

A demulsifier dosage of 3000 ppm provided a water turbidity level of as low as 17.6 NTU. This emulsion contained 5% oil. Neither the poly(DADMAC) nor the anionic flocculant by themselves exhibited any emulsion breaking activity whatsoever. The hydrophobically-modified copolymer demulsifier according to the present invention was found to be better able to interact with the oil and precipitate it due to its hydrophobic properties.

EXAMPLE 9

Figure 2:
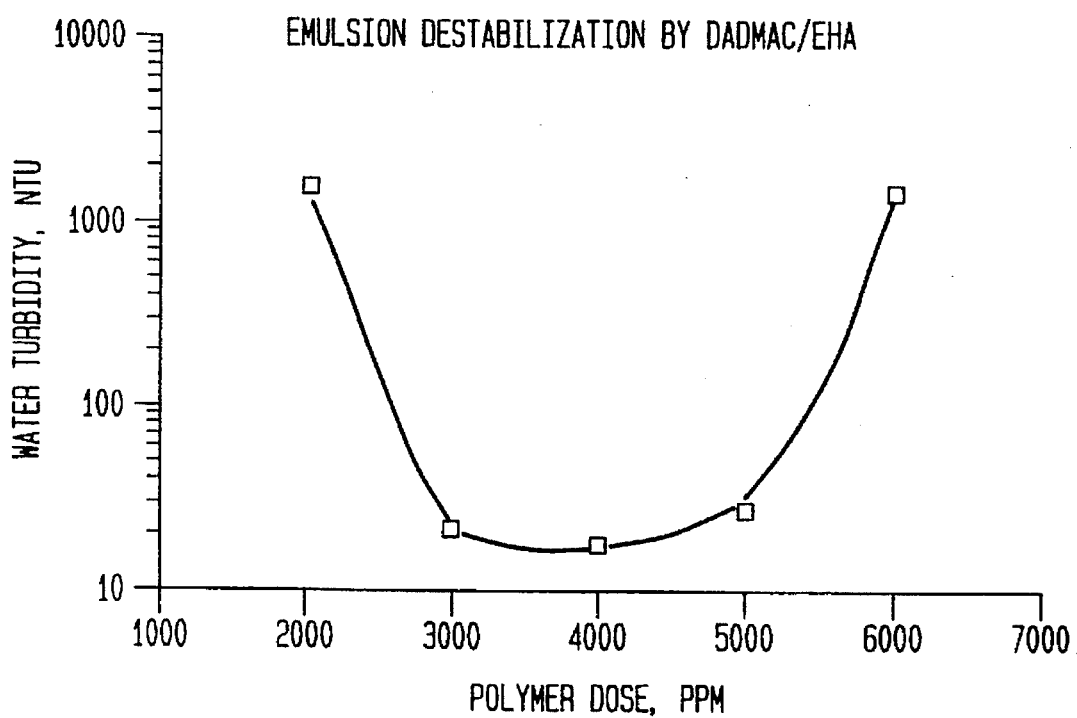
FIG. 2 is a graph plotting water turbidity versus DADMAC/EHA dosage.

A bottle test was used to evaluate the hydrophobically-modified polymer of diallyldimethylammonium chloride (DADMAC) and ethylhexylacrylate (EHA) as a demulsifier. The demulsifier was added to 100 ml of the emulsion in a bottle, thoroughly shaken and heated at 160° F. for 45 minutes in a water bath. Then an anionic flocculant was added to flocculate the precipitated oil and the emulsion was further heated for 30 minutes. Then the water and oil were separated and the turbidity of the water was measured using a Hach turbidimeter. The results of the bottle test are set forth below in Table 3 and FIG. 2 (attached hereto).

TABLE 3

| (DADMAC/EHA) | |
|---|---|
| Polymer Dosage (ppm) | Water Turbidity (NTU) |
| 0 | >2000 |
| 2000 | 1650 |
| 3000 | 21.5 |
| 4000 | 17.6 |
| 5000 | 28.2 |
| 6000 | 1600 |

A demulsifier dosage of 4000 ppm provided a water turbidity level of as low as 17.6 NTU.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

We claim:

1. A method for breaking an oil-in-water emulsion which comprises:

A. adding an effective emulsion-breaking amount of a hydrophobically-modified polyelectrolyte copolymer selected from the group consisting of poly (diallyldimethylammonium chloride/dimethylaminoethylacrylate benzyl chloride quaternary), poly(diallyldimethylammonium chloride/dimethylaminoethylacrylate cetyl chloride quaternary), poly(diallyldimethylammonium chloride/dimethylaminoethylmethacrylate benzyl chloride quaternary) and poly(diallyldimethylammonium chloride/dimethylaminoethylmethacrylate cetyl chloride quaternary to the oil-in-water emulsion;

B. allowing said emulsion to separate into an oil phase and a water phase; and,

C. recovering said separated phases.

2. The process according to claim 1 wherein said hydrophobically-modified polyelectrolyte copolymer is added to said oil-in-water emulsion in an amount of between 0.03 to about 1.0% by weight of said emulsion.

3. The process according to claim 1 wherein said hydrophobically-modified polyelectrolyte copolymer consists of diallyldimethylammonium chloride and the hydrophobically-associating monomer which are present in a molar ratio in the range from 99:1 to 20:80.

* * * * *